United States Patent

Stimac

[11] Patent Number: 5,845,921
[45] Date of Patent: Dec. 8, 1998

[54] THREE-DIMENSIONALLY ADJUSTABLE TRAILER HITCH

[75] Inventor: Michael Jon Stimac, Wyandotte, Mich.

[73] Assignee: Ford Global Technologies, Inc., Dearborn, Mich.

[21] Appl. No.: 746,588

[22] Filed: Nov. 12, 1996

[51] Int. Cl.⁶ ........................................ B60D 1/14
[52] U.S. Cl. ................................ 280/479.3; 280/491.2
[58] Field of Search .................. 280/477, 478.1, 280/479.1, 479.2, 479.3, 491.2

[56] References Cited

U.S. PATENT DOCUMENTS

| | | | |
|---|---|---|---|
| 4,042,254 | 8/1977 | Allen | 280/478.1 |
| 4,178,011 | 12/1979 | Kirsch | 280/477 |
| 4,362,312 | 12/1982 | Deiaco et al. | 280/404 |
| 4,466,632 | 8/1984 | DeVorak | 280/478.1 |
| 4,575,112 | 3/1986 | Tremblay | 280/479.2 |
| 4,687,220 | 8/1987 | Danielson | 280/477 |
| 4,770,436 | 9/1988 | Anderson | 280/463 |
| 4,807,899 | 2/1989 | Belcher | 280/477 |
| 4,869,521 | 9/1989 | Johnson | 280/491.1 |
| 4,991,865 | 2/1991 | Francisco | 280/477 |
| 5,000,473 | 3/1991 | Johnson | 280/491.1 |
| 5,011,176 | 4/1991 | Eppinette | 280/479.3 |
| 5,011,177 | 4/1991 | Grice | 280/482 |
| 5,048,854 | 9/1991 | Clark | 280/477 |
| 5,203,582 | 4/1993 | Smyly, Sr. | 280/477 |

*Primary Examiner*—Kevin Hurley
*Attorney, Agent, or Firm*—David B. Kelley

[57] ABSTRACT

A trailer hitch has a plurality of longitudinally tapered, telescoping members movable between a retracted position substantially contained within a largest of the telescoping members and an extended position in which at least one of the plurality of telescoping members is extendible from the largest member so as to be three-dimensionally adjustable.

12 Claims, 5 Drawing Sheets

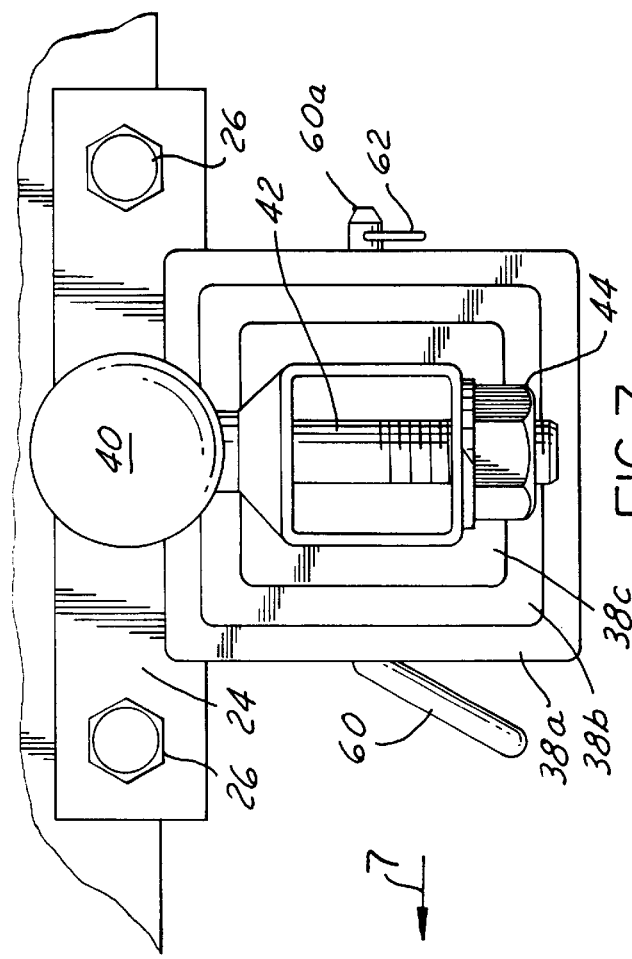

THREE-DIMENSIONALLY ADJUSTABLE TRAILER HITCH

FIELD OF THE INVENTION

The present invention relates generally to self-aligning trailer hitches, and, more specifically, to telescoping trailer hitches.

BACKGROUND OF THE INVENTION

Implements for attaching a towed vehicle, or trailer, to a tow vehicle, that is, a vehicle which pulls the trailer, typically include a hitch attached to a rear portion of the tow vehicle. The hitch usually has a ball which couples to a socket on a tongue member of the trailer. In order to make the hitch connection, the tow vehicle is adjusted forward and backward until the ball is horizontally aligned beneath the socket. A tongue is then lowered onto the ball and further attachment is then completed.

A drawback to the foregoing is the trail-and-error required to vertically position the ball below the socket. The situation is exacerbated when a single person attempts to make the hitch connection, since that person must move the vehicle forward and backward while intermittently leaving the vehicle to observe ball-to-socket alignment. Prior approaches to simplifying the hitch alignment problem include a one-dimensional telescoping hitch having a pivotal end member which permits limited movement in the horizontal plan, as seen in U.S. Pat. No. 4,991,865 (Francisco). This device, however, provides only a limited amount of horizontal alignment capability, and no self-alignment movement in the vertical plane, thus requiring some alignment as the trailer tongue socket is lowered onto the ball.

A trailer hitch is therefore needed which provides both horizontal and vertical alignment between the tow vehicle and the trailer.

SUMMARY OF THE INVENTION

Responsive to the deficiencies in the related art, the present invention is a new and improved trailer hitch which is three-dimensionally adjustable for providing a connection between a tow vehicle and a trailer. The trailer hitch has a least two longitudinal tapered, telescoping tubular members, each having a narrow end and a wide end. The wide end has a cross section greater than that of the narrow and has a flange there around. The tubular members are intermeshed so that the narrow end of each of the tubular members, except the largest of the tubular members, fits substantially through the wide end of an adjacent tubular member and is prevented from moving completely into it by the flange on the wide end. Each of the tubular members, except the largest, is longitudinally moveable with respect to the adjacent, larger tubular member between a sheathed position substantially contained in the larger tubular member and a drawn position extended therefrom such that a tolerance is created between an inner surface of the adjacent, larger tubular member and an outer surface of the tubular member. The tolerance thus permits three-dimensional adjustment of the tubular member with respect to the adjacent, larger tubular member. In addition, each tubular member has a stop means thereon for preventing movement completely out of the adjacent, larger tubular member. The tow vehicle has an attachment for attaching the largest of the tubular members to the tow vehicle, such as a metal plate, and a trailer attachment, such as a conventional hitch ball, for attaching a smallest of the tubular members to the trailer. The trailer hitch is moveable between a retracted position which the tubular members are substantially contained within the largest of the tubular members, and an extended position in which at least of the tubular members is extended from the largest so as to be three-dimensionally adjustable so that the hitch ball can attach to the trailer. With this invention, the tow vehicle driver need only position the tow vehicle within a certain distance of the trailer. The hitch connection can then be easily made without need for vertical or horizontal alignment of the vehicle with respect to the trailer.

Preferably, the stop means on the tubular members comprise a swaged cable connected through the tubular members, or alternatively flexible flange members which interact with the flange on the wide end of the tubular members.

After the hitch connection has been made, the trailer can then be vertically adjusted and the tow vehicle backed toward the trailer so that the tubular members intermesh again inside the largest of the tubular members. Once the hitch is in the retracted position, the tubular members are locked together, for example by a locked pin inserted through a plurality of aligned orifices through the tubular members.

An advantage of the present invention is a trailer hitch which is three-dimensionally adjustable.

Another advantage of the present invention is a trailer hitch which simplifies connection between a tow vehicle and a trailer.

A feature of the present invention is a plurality of longitudinally papered tubular members intermeshed so as to be extendible and adjustable in 3 dimensions.

BRIEF DESCRIPTION OF THE DRAWINGS

These and other objects, advantages, and features of the present invention will be apparent to those skilled in the trailer hitch art upon reading the following description with reference to the accompanying drawings, in which:

FIG. 6 is a side cross-sectional view of an embodiment of a trailer hitch according to the present invention shown in a retracted position;

FIG. 7 is an end view taken in the direction of arrow 7 of FIG. 6;

FIG. 8 is a cross-sectional view similar to FIG. 6 but showing the trailer hitch of the present invention in an extended position;

3

Figure 11:
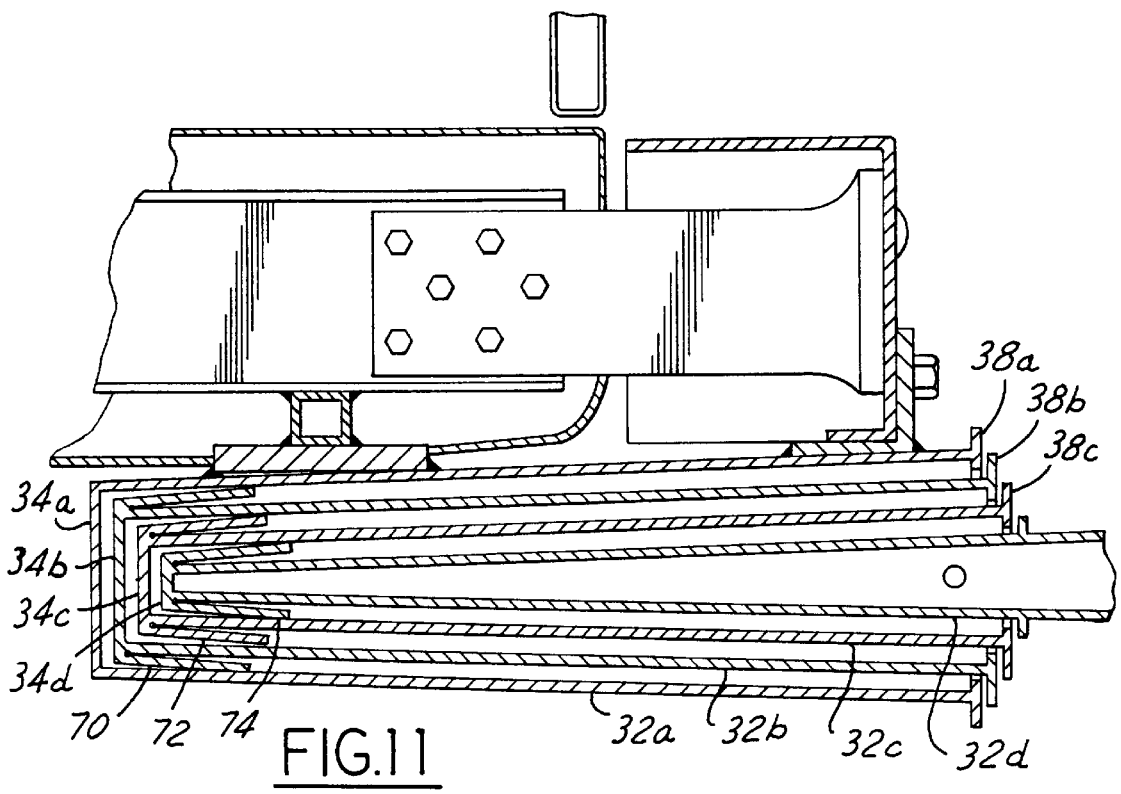
Figure 12:
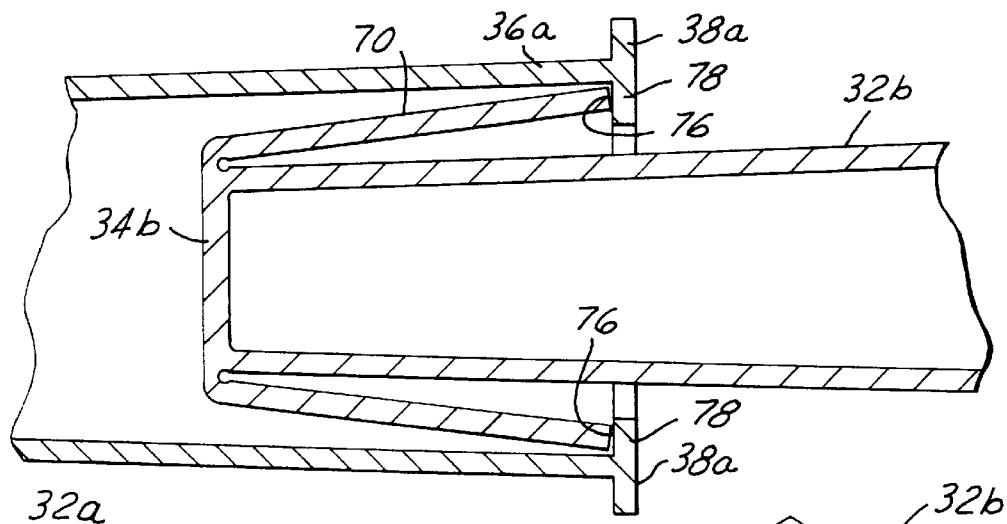
Figure 13:
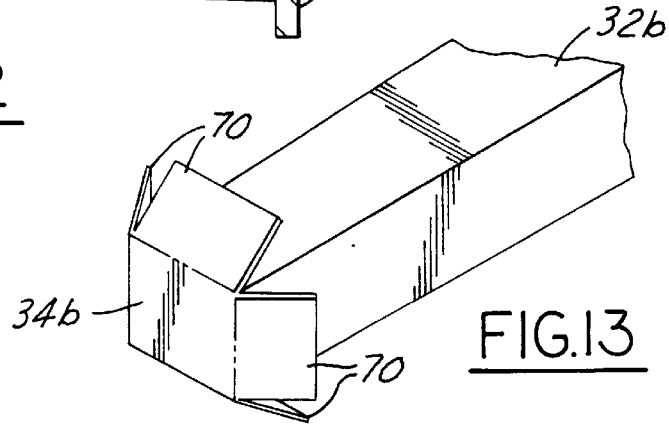
Figure 14:
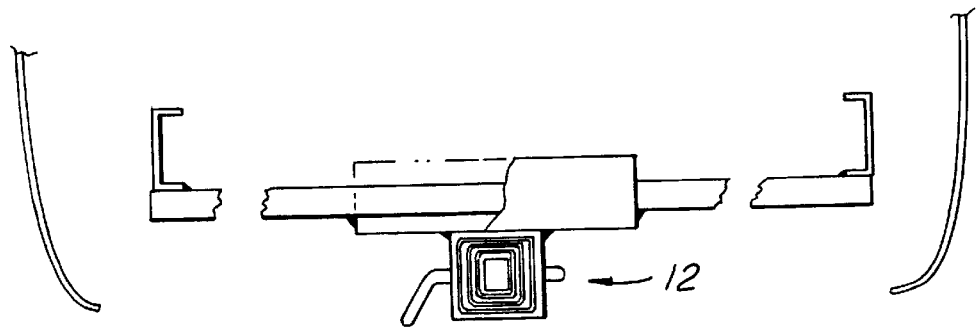
Figure 15:
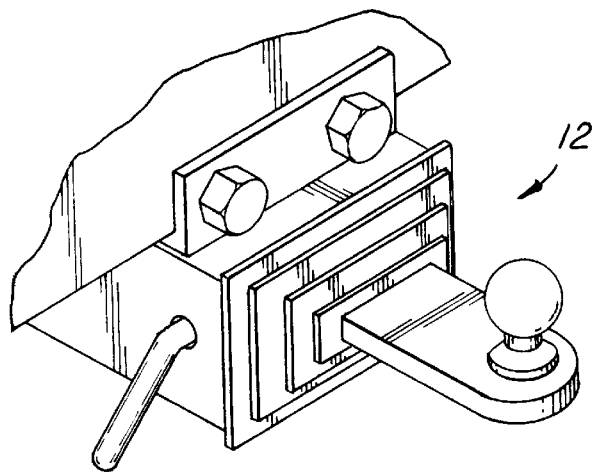
Figure 16:
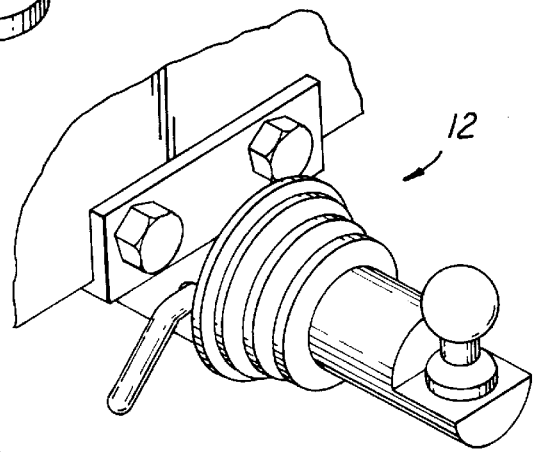
Figure 17:
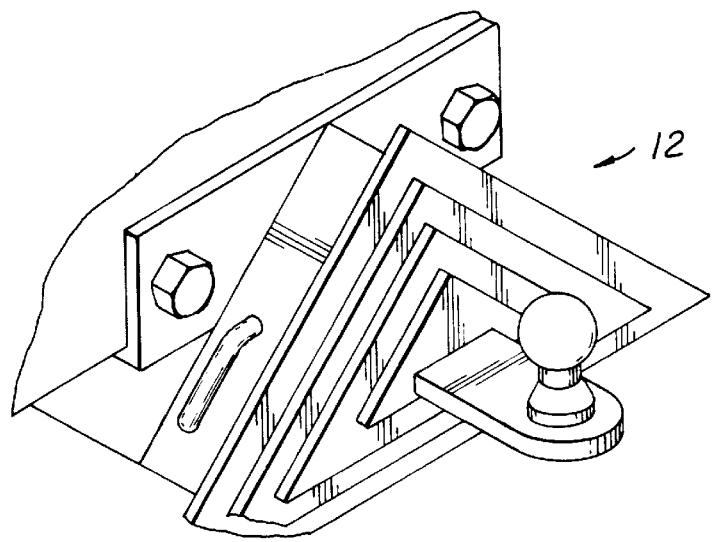

FIG. 11 is a cross-sectional view of an alternative embodiment of a tow hitch according to the present invention shown in a retracted position;

FIG. 12 is a sectional view of a portion of the hitch shown in FIG. 11 when in an extended position;

FIG. 13 is a perspective view of a narrow end of a tubular member of the hitch of FIG. 11 showing a flanged stop member;

FIG. 14 is an end view of a tow vehicle having a hitch according to the present invention attached thereto in the retracted position with a hitch pin holding the tubular members in lock relationships;

FIG. 15 is a perspective view of a hitch according to the present invention shown in a retracted position with the tubular members having a rectangular cross-section;

FIG. 16 is a perspective view similar to FIG. 15 but showing the tubular members having a circular cross-section; and FIG. 17 is a perspective view similar to FIG. 15 but showing the tubular members having a triangular cross-section.

DETAILED DESCRIPTION OF THE PREFERRED EMBODIMENT

Figure 1:
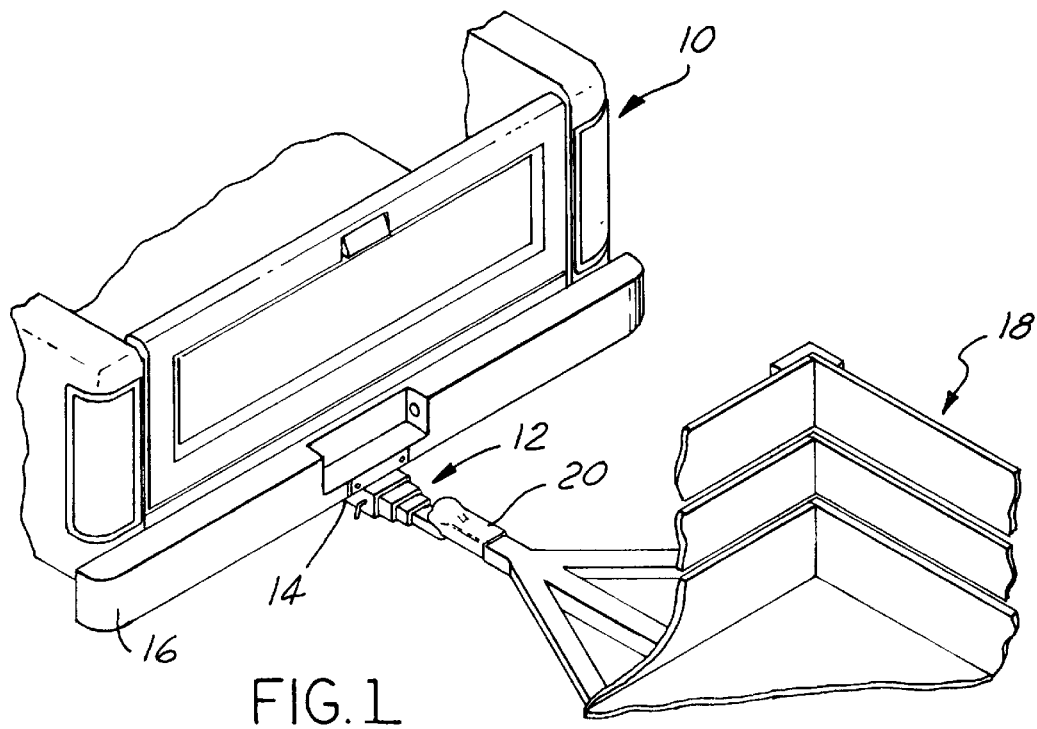
FIG. 1 is a perspective view of a tow vehicle having a hitch according to the present invention attached thereto shown in a retracted position with a tongue of a trailer attached to the hitch.

Referring now to the drawings, and in particular to FIG. 1 thereof, a tow vehicle 10 has a trailer hitch 12 attached thereto at a lower rear section 14 thereof, for example beneath a bumper 16. A towed vehicle, or trailer 18, has a tongue 20 extending therefrom with a socket 22 for attachment to the hitch 12, as in further described below. While the hitch 12 is conventionally mounted to the vehicle pin, those skilled in the art will recognize that it may also be mounted to the trailer 18 and the tongue 20 and socket 22 maybe mounted to the tow vehicle 10 without departing from the intention of the invention.

Figure 2:
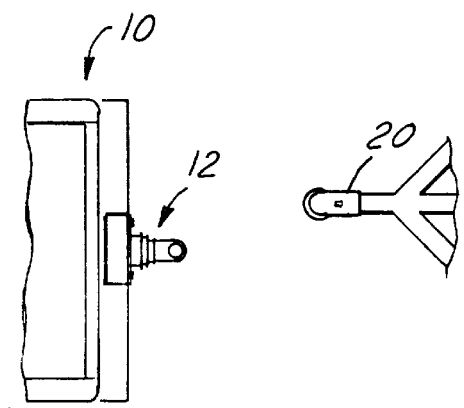
FIG. 2 is a top view of a tow vehicle and trailer tongue misalignment in a horizontal plane.
Figure 3:
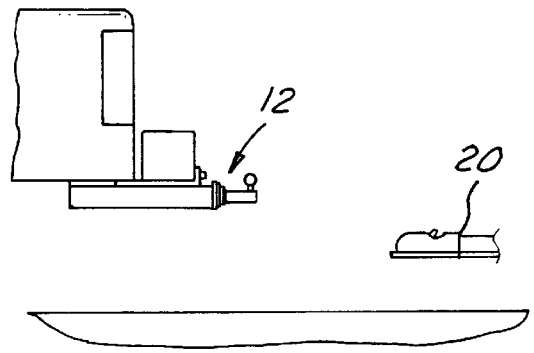
FIG. 3 is a side view showing tow vehicle and trailer tongue misalignment in a vertical plane.
Figure 4:
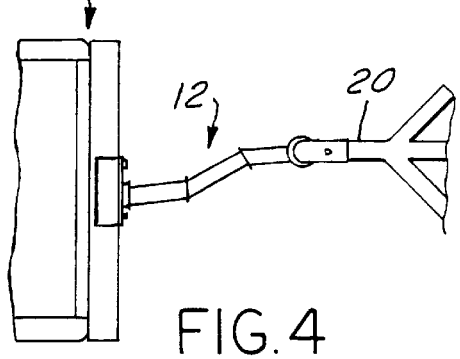
FIG. 4 is a top view similar to FIG. 2 but showing correction for the horizontal misalignment through use of the trailer hitch of the present invention.
Figure 5:
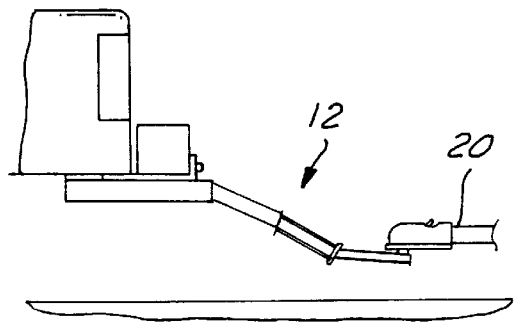
FIG. 5 is a side view similar to FIG. 3 but showing correction of vertical misalignment between the tow vehicle and the trailer tongue through use of the trailer hitch according to the present invention.

As seen in FIGS. 2 and 3, the hitch 12 and the tongue 20 are typically both horizontally misaligned (FIG. 2) and vertically (FIG. 3) misaligned prior to making a connection therebetween. As is explained below, the hitch 12 of the present invention enables connection between the tow vehicle 10 and the tongue 20 in both the horizontal plane (FIG. 4) and the vertical plane (FIG. 5). As will be seen, the trailer hitches thus adjustable in three-dimensions.

Referring now to FIG. 6, a trailer hitch 12 according to a preferred embodiment of the present invention is shown in a retracted position. The trailer hitch 12 is attached, for example by welding, to a plate 24, the plate then being attached with bolts 26 to bumper 16. A second plate 28 is welded to the hitch 12 and to a cross beam 30 attached to the tow vehicle 10.

As best seen in FIG. 6–8, the trailer hitch 12 has four longitudinally tapered, intermeshed tubular members 32a–32d. Each of the tubular members 32a–32d has a narrow end 34a–34d and a wide end 36a–36d with a cross-section greater than that of the corresponding narrow end 34a–34d (FIG. 8). Around the wide ends 36a–36c are flanges 38a–38c for preventing movement completely into a peripherally larger tubular member. For example, the flange 38b prevents the tubular member 32b from sliding completely into the tubular member 32a, which, as seen in FIG. 6, is peripherally larger. The tubular member 32d, the peripherally smallest of the tubular members, has trailer attachment means attached on the wide end 36d, the trailer attachment means in the form of a convention hitch ball 40 with a bolt 42 and nut 44 serving as the attachment. The hitch ball 40 and the nut 44 serve to prevent the tubular member 32d from moving completely into adjacent, peripherally larger tubular member 32c. Movement of the tubular member 32b–32d completely out of adjacent, peripherally larger tubular members 32a–32c, respectively, is accomplished by a swaged cable 46. The swaged cable 46 is attached on a first end 48 to the narrow end 34a of the peripherally largest tubular member 32a and passes through the narrow ends 34b–34d of the tubular members 32b–32d, respectively. Within the narrow ends 34b–34d of each of the tubular members 32b–32d are retention balls 50b–50d. Retention balls 50b–50d abut the narrow ends 34b–34d (FIG. 8) to prevent complete movement out of the peripherally larger tubular member. Each of the tubular members 32b–32d are thus longitudinally moveable with respect to the adjacent, peripherally larger tubular members 32a–32c, respectively between a sheathed position substantially contained in the adjacent, peripherally larger tubular member (FIG. 6), in a drawn position extended from the adjacent, peripherally larger tubular member (FIG. 8). In the drawn position, a tolerance is created between an outer surface of a tubular member and an inner surface of an adjacent, peripherally larger tubular member. As an example in FIG. 8, a tolerance 52 is created between an inner surface 54 of the tubular member 32b and a the outer surface 56 of the tubular member 32c. This tolerance 52 permits the tubular member 32c to be three-dimensionally adjusted with respect to the tubular member 32b. The tapered shape of the tubular members results in the tolerance, and thus the three-dimensional adjustment capability of the trailer hitch 12.

The swaged cable 46 may have a retention ball 50a on the narrow end 34a to prevent movement of the swaged cable 46.

Each of the tubular members 32a–32d has a transversely extending orifice 58a–58d (FIG. 8), respectively, which are transversely aligned when the trailer hitch 12 is in the retracted position (FIG. 6). When in the retracted position, a lock pin 60 may be inserted through the orifices 58a–58d (FIG. 7) to prevent the trailer hitch 12 from moving to an extended position. The lock pin 60 may be secured in the trailer hitch 12 by a clip 62 attached through an end 60a of the lock pin 60 in known fashion.

Figure 9:
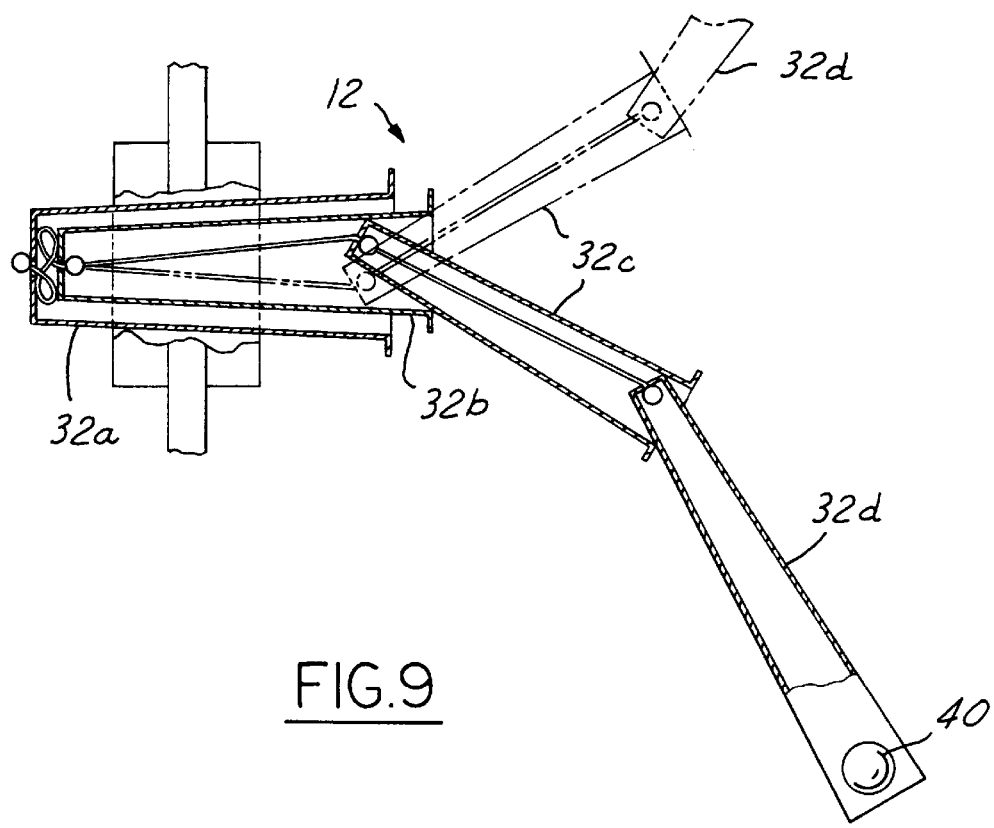
FIG. 9 is a side view of a trailer hitch according to the present invention shown a vertically extended position.
Figure 10:
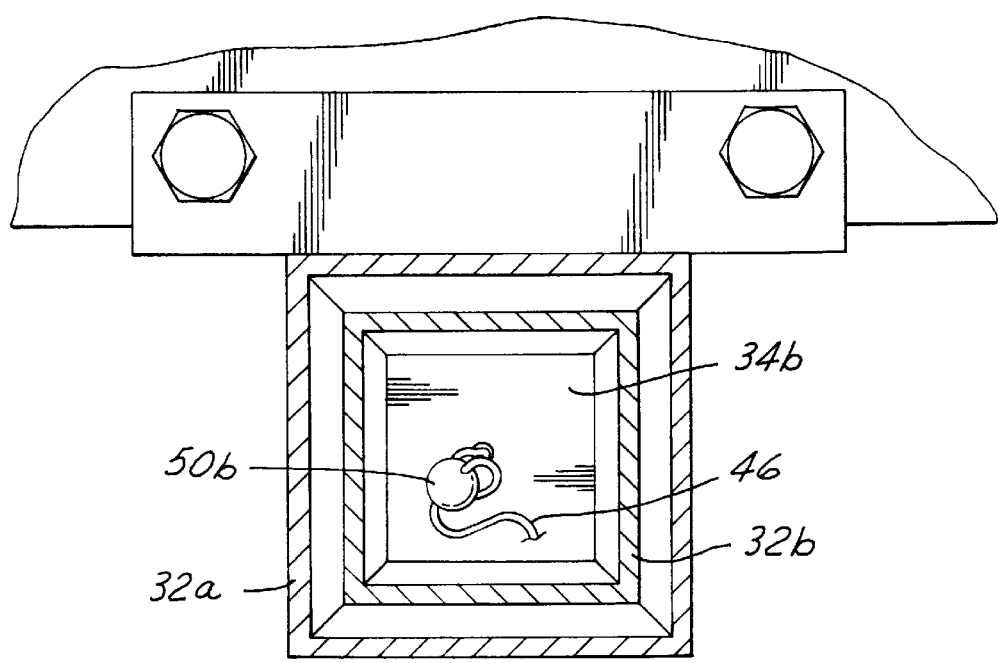
FIG. 10 is a cross-sectional view taken along line 10—10 of FIG. 8.

The trailer hitch 12 as described is thus moveable between a retracted position (FIG. 6) in which the tubular members 32b–32d are substantially contained in the peripherally largest tubular member 32a, and the extended position (FIGS. 8 and 9) in which at least one of the tubular members 32b–32d is telescopically extended from the peripherally largest tubular member 32a so as to be three-dimensionally adjustable with respect thereto. As seen in FIG. 9, it is not necessary for each of the tubular members 32b–32d to be extended from the peripherally largest tubular member 32a. In addition, a tubular member 32b–32d can be extended fully or partly from an adjacent, peripherally larger tubular member. The tubular members telescope with respect to each other as they move between the retracted and extended positions.

Referring now to 11–13, an alternative embodiment of a trailer hitch according to the present to the present invention is shown. The components of this embodiment are substantially similar to those of the previously discussed embodiment and like numbers will be used to identify like components where there are similarities. In the embodiment of FIGS. 11–13, movement of tubular members 32b–32d out of adjacent, peripherally larger tubular members 32a–32c, respectively, as accomplished by expanded flanges 70, 72, and 74 attached respectively to the narrow ends 34b–34d of the tubular members 32b–32d. The expanded flanges 70, 72, 74 replaced the swaged cable 46 of the previously discussed embodiment. Operation of the expanded flanges to prevent the movement of a tubular member out of an adjacent tubular member will be illustrated with respect to FIG. 12. In FIG. 12, the tubular member 32b has an expanded flange 70 attached on the narrow end 34b and is in an extended position within the adjacent, peripherally larger tubular member 32a. The expanded flange 70 has edges 76 which abut a lower portion 78 of the flange 38 to prevent the narrow end 34b of the tubular member 32b from moving out of the wide end 36a of the tubular member 32a. As seen in FIG. 13, four peripherally positioned flange members 70 may be attached at the narrow end 34b of the tubular member 32b to effect prevention of complete outward movement of the tubular member 32b from the adjacent, encasing tubular member 32a. In a preferred embodiment, the flanges are flexibly movable between a depressed position (FIG. 11) and an expanded position (FIGS. 12–13).

It should be understood that the tubular members 32a–32d may have cross sections of other shapes, such as a rectangular cross-section (FIG. 15), a circular cross-section (FIG. 16), or a triangular cross-section (FIG. 17), in addition to the square cross-section shown in (FIG. 14). Other cross-sectional shapes may also be possible. If a circular-cross section is selected, the tapered nature of the tubular members which provides the advantageous three-dimensional adjustment capability of the present invention, would thus be frustoconically shaped.

Although the preferred embodiment of the present invention has been disclosed, various changes and modifications may be made without departing from the scope of the invention as set forth in the appended claims.

I claim:

1. A three-dimensionally adjustable trailer hitch for providing a connection between a tow vehicle and a trailer, the trailer hitch comprising:
   (a) a plurality of longitudinally tapered tubular members,
      (i) each of the plurality of tubular members having a narrow end and a wide end with a cross-section greater than that of the narrow end and a flange therearound,
      (ii) the tubular members intermeshed so that the narrow end of each of the tubular members, except a peripherally largest of the tubular members, fits through the wide end of a longitudinally adjacent tubular member and is prevented from moving completely thereinto by the flange on the wide end, and
      (iii) wherein each of the plurality of tubular members except the peripherally largest thereof has stop means thereon for preventing movement out of an adjacent, peripherally larger tubular member;
   (b) tow vehicle attachment means for attaching one of the plurality of tubular members to the tow vehicle;
   (c) trailer attachment means for attaching another of the plurality of tubular members to the trailer;
   (d) the trailer hitch movable between:
      (i) a retracted position in which the plurality of tubular members are substantially contained within the peripherally largest of the tubular members, and
      (ii) an extended position in which at least one of the plurality of tubular members is extended from the peripherally largest member so as to be three-dimensionally adjustable to attach to one of the tow vehicle or the trailer; and
   (e) hitch lock means for locking the plurality of tubular members in the retracted position.

2. A trailer hitch according to claim 1 wherein the tow vehicle attachment means comprises a plate attached to the narrow end of the peripherally largest of the tubular members.

3. A trailer hitch according to claim 1 wherein the towed vehicle attachment means comprises a hitch ball attached to the wide end of a peripherally smallest of the tubular members.

4. A trailer hitch according to claim 1 wherein the plurality of tubular members are frustoconically shaped.

5. A trailer hitch according to claim 1 wherein the plurality of tubular members has a generally square cross-section.

6. A trailer hitch according to claim 1 wherein the plurality of tubular members has a generally triangular cross-section.

7. A trailer hitch according to claim 1 wherein the hitch lock means comprises a lock pin and a plurality of orifices, each of the tubular members having one of the orifices laterally therethrough and longitudinally positioned thereon so that when the trailer hitch is in the retracted position, the orifices are laterally aligned so as to receive the lock pin therethrough.

8. A three-dimensionally adjustable trailer hitch for providing a connection between a tow vehicle and a trailer, the trailer hitch comprising:
   (a) a plurality of longitudinally tapered, telescoping tubular members,
      (i) each of the plurality of tubular members having a narrow end and a wide end with a cross-section greater than that of the narrow end and a flange there around,
      (ii) the plurality of tubular members intermeshed so that the narrow end of each of the tubular members, except a peripherally largest of the tubular members, fits substantially through the wide end of an adjacent, peripherally larger tubular member and is prevented from moving completely thereinto by the flange on the wide end,
      (iii) each of the plurality of tubular members, except a peripherally largest of the tubular members, longitudinally movable with respect to the adjacent, peripherally larger tubular member between a sheathed position substantially contained therein and a drawn position extended therefrom such that a tolerance is created between an inner surface of the adjacent, peripherally larger tubular member and an outer surface of the tubular member, the tolerance permitting three-dimensional adjustment of the tubular member with respect to the adjacent, peripherally larger tubular member;
      (iv) wherein each of the plurality of tubular members except the peripherally largest thereof has stop means associated therewith for preventing movement completely out of the adjacent, peripherally larger tubular member;
   (b) tow vehicle attachment means for attaching the largest of the plurality of tubular members to the tow vehicle;
   (c) trailer attachment means for attaching a smallest of the plurality of tubular members to the trailer;
   (d) the trailer hitch movable between:
      (i) a retracted position in which the plurality of tubular members are substantially contained within the peripherally largest of the tubular members, and
      (ii) an extended position in which at least one of the plurality of tubular members is extended from the peripherally largest member so as to be three-dimensionally adjustable to attach to one of the tow vehicle or the trailer; and (e) hitch lock means for locking the plurality of tubular members in the retracted position.

9. A trailer hitch according to claim 8 wherein the stop means is a swaged cable connected through the plurality of tubular members.

10. A trailer hitch according to claim 8 wherein the stop means is at least one expanded flange on the narrow end of each of the plurality of tubular members so as to interact with the flange on the wide end of an adjacent, peripherally larger tubular member.

11. A trailer hitch according to claim 10 wherein the at least one expanded flange is flexibly movable between an expanded position and a depressed position.

12. A trailer hitch according to claim 8 wherein the hitch lock means comprises a lock pin and a plurality of orifices, each of the tubular members having one of the orifices laterally therethrough and longitudinally positioned thereon so that when the trailer hitch is in the retracted position, the orifices are laterally aligned so as to receive the lock pin therethrough.

* * * * *